(12) United States Patent
Sawada (10) Patent No.: US 12,136,870 B2
(45) Date of Patent: Nov. 5, 2024

(54) BUCK CONVERTER HAVING SUPER-JUNCTION MOSFET

(71) Applicant: ROHM CO., LTD., Kyoto (JP)

(72) Inventor: Akinobu Sawada, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/643,371

(22) Filed: Dec. 8, 2021

(65) Prior Publication Data

US 2022/0190725 A1    Jun. 16, 2022

(30) Foreign Application Priority Data

Dec. 16, 2020  (JP) .................................. 2020-208250

(51) Int. Cl.
*H02M 1/00*    (2007.01)
*H02M 1/08*    (2006.01)
*H02M 3/156*   (2006.01)

(52) U.S. Cl.
CPC .......... *H02M 1/0054* (2021.05); *H02M 1/08* (2013.01); *H02M 3/156* (2013.01)

(58) Field of Classification Search
CPC .... H02M 3/156; H02M 3/155; H02M 1/0054; H02M 1/08
See application file for complete search history.

(56) References Cited

U.S. PATENT DOCUMENTS

| | | | | |
|---|---|---|---|---|
| 7,126,801 B2* | 10/2006 | Jokinen | ................ | H02H 11/003 361/85 |
| 9,293,999 B1* | 3/2016 | Lam | .................. | H02M 3/33592 |
| 9,800,136 B2* | 10/2017 | Eum | ........................ | H02M 1/32 |
| 9,966,837 B1* | 5/2018 | Seaton | ..................... | H02M 1/32 |
| 2013/0100710 A1* | 4/2013 | Kang | ..................... | H02H 7/125 361/118 |
| 2016/0072393 A1* | 3/2016 | McIntyre | .......... | H02M 3/33584 363/21.1 |
| 2016/0134193 A1 | 5/2016 | Lin et al. | | |
| 2016/0226560 A1* | 8/2016 | Dent | ................... | H04L 12/2838 |
| 2018/0034365 A1* | 2/2018 | Sicard | ..................... | H02M 3/158 |
| 2022/0006374 A1* | 1/2022 | Warnes | ................ | H02H 11/003 |
| 2022/0014093 A1* | 1/2022 | Ammar | .................... | H02M 3/07 |
| 2023/0387912 A1* | 11/2023 | Nosaka | ............. | H03K 17/6871 |

FOREIGN PATENT DOCUMENTS

| | | |
|---|---|---|
| JP | 2011193549 A | 9/2011 |
| JP | 2019161905 A | 9/2019 |
| WO | 2018051512 A1 | 3/2018 |
| WO | 2019097662 A1 | 5/2019 |

OTHER PUBLICATIONS

Office Action and Search Report issued in Japanese Application No. 2020-208520, dated Aug. 20, 2024, with machine translation, 31 pages provided.

* cited by examiner

*Primary Examiner* — Gustavo A Rosario-Benitez
(74) *Attorney, Agent, or Firm* — HSML P. C.

(57) ABSTRACT

The present disclosure provides a buck converter for achieving a high output and reducing cost. The buck converter includes: a MOSFET, including a first side connected to an application end of an input voltage; a rectifying element, connected to a second side of the MOSFET by a first connection node; a coil, having a first terminal connected to the first connection node; and an output capacitor, connected to a second terminal of the coil. The MOSFET is a super-junction MOSFET.

17 Claims, 7 Drawing Sheets

BUCK CONVERTER HAVING SUPER-JUNCTION MOSFET

TECHNICAL FIELD

The present disclosure relates to a buck converter.

BACKGROUND

Conventionally, a power supply circuit referred to as a buck converter is mounted on various types of electronic machines. A buck converter is a step-down direct-current (DC)/DC switching regulator that uses switching of a metal-oxide-semiconductor field-effect transistor (MOSFET) to step down an input voltage and generate the output voltage, and is an asynchronous rectification, non-isolated converter that performs rectification by a diode (for example, Patent document 1).

PRIOR ART DOCUMENT

Patent Document

[Patent document 1] Japanese Patent No. 2019-161905

SUMMARY

Issue to be Solved by the Disclosure

Herein, it is expected that an output of a power supply circuit can be increased for the cause of recent Internet of Things (IoT) of home appliances equipped with power supply circuits. An insulated converter, that is, a flyback converter, is sometimes used conventionally as a power supply circuit with a high output. However, due to a costly transformer used or due to a larger number of parts, a flyback converter is more disadvantageous in terms of cost.

In contrast, a buck converter is more advantageous in terms of cost as it uses cheap coils or has a smaller number of parts, and is thus used in substitution for the flyback converter. However, in a buck converter, a peak value of a current flowing through a MOSFET is inclined to increase. If a high output is to be achieved, power loss in the MOSFET is then increased. The power loss of the MOSFET is associated with heating, and this may become the main reason that inhibits a high output in a buck converter. Specifically, an output limit of a buck converter is approximately 10 W.

In view of the situation above, it is an object of the disclosure to achieve a high output (for example, approximately 20 W) in a buck converter that is advantageous in terms of cost.

Technical Solutions for Solving the Problem

A buck converter of the disclosure is configured as (a first configuration) including: a metal-oxide-semiconductor field-effect transistor (MOSFET), including a first side connected to an application end of an input voltage; a rectifying element, connected to a second side of the MOSFET by a first connection node; a coil, having a first terminal connected to the first connection node; and an output capacitor, connected to a second terminal of the coil, wherein the MOSFET is a super-junction MOSFET.

The first configuration may also be configured as a second configuration, wherein a switching frequency of the MOSFET is in a range of 20 kHz to 30 kHz, and inductance of the coil is equal to or more than 300 μH (microhenry).

The first or second configuration may also be configured as a third configuration, which further includes: a first resistor, having a first end portion connected to a gate of the MOSFET; a second resistor, having an end connected to a second end portion of the first resistor; and a diode, having an anode connected to the first end portion of the first resistor, and a cathode connected to the second end portion of the first resistor.

Any one of the first to third configurations may also be configured as a fourth configuration, wherein the rectifying element is a fast recovery diode.

The fourth configuration may also be configured as a fifth configuration, which further includes: an input capacitor, connecting to and between the application end of the input voltage and a grounded line, wherein a wiring length between a cathode of the fast recovery diode and the first terminal of the coil is shorter than a wiring length between a second connection node and a third connection node, wherein the second connection node is disposed between the anode of the fast recovery diode and the grounded line, and the third connection node is disposed between the input capacitor and the grounded line.

The fourth or fifth configuration may also be configured as a sixth configuration, which further includes: an input capacitor, connecting to and between the application end of the input voltage and the grounded line, wherein a wiring length between the second side of the MOSFET and the first terminal of the coil is shorter than a wiring length between the second connection node and the third connection node, wherein the second connection node is disposed between the anode of the fast recovery diode and the grounded line, and the third connection node is disposed between the input capacitor and the grounded line.

Any one of the first to sixth configurations may also be configured as a seventh configuration, which further includes a diode, a capacitor and a control integrated circuit (IC), wherein the MOSFET is disposed in the control IC, an anode of the diode is connected to the second terminal of the coil, an cathode of the diode is connected to a first end of the capacitor, a second end of the capacitor is connected to the first terminal of the coil, and a voltage is generated at a node to which the cathode of the diode and the first end of the capacitor are connected as a feedback voltage to be applied to the control IC.

Any one of the first to seventh configurations may also be configured as the following: when the MOSFET is in an off state, a coil current flowing through the coil decreases and reaches 0 A (ampere).

Effects of the Disclosure

According to the disclosure, a high output and reduced power loss are achieved in a buck converter that is more advantageous in terms of cost.

DETAILED DESCRIPTION OF THE EMBODIMENTS

Exemplary embodiments of the disclosure are described with the accompanying reference drawings below.

<1. Issue of a Buck Converter>

Figure 1:
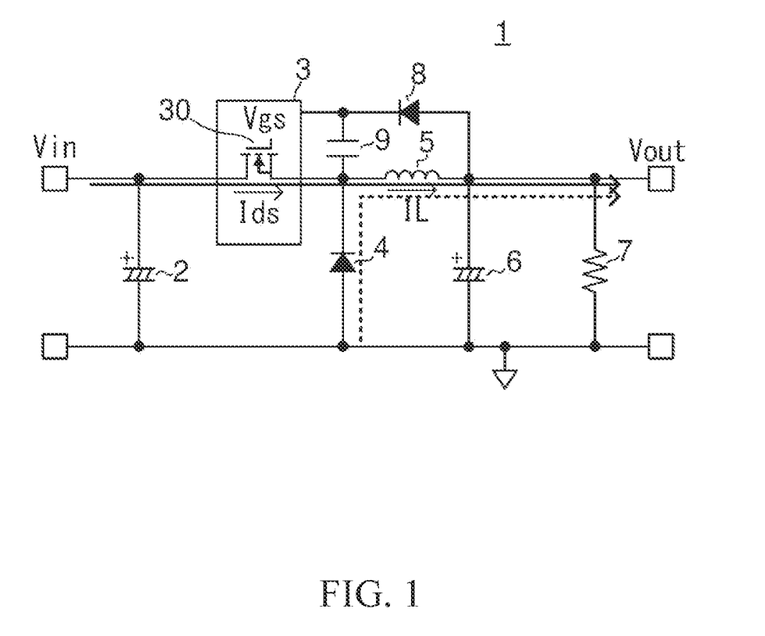
FIG. 1 is a circuit diagram of a configuration of a buck converter according to an exemplary embodiment of the disclosure.

Issues of a buck converter are first described. FIG. 1 shows a configuration example of a buck converter. A buck converter 1 shown in FIG. 1 is an asynchronous rectification converter that steps down an input voltage Vin into an output voltage Vout by a direct-current (DC)/DC converter.

The buck converter 1 includes an input capacitor 2, a control integrated circuit (IC) 3, a fast recovery diode 4, a coil (inductor) 5, an output capacitor 6, a resistor 7, a diode 8 and a capacitor 9. The fast recovery diode 4 is an example of a rectifying element.

One end of the capacitor 2 is connected to a DC voltage, that is, an application end of the input voltage Vin. The other end of the input capacitor 2 is connected to an application end of a ground potential.

The control IC 3 includes a MOSFET 30 that serves as a switching element. The MOSFET 30 is an N-channel MOSFET. A drain of the MOSFET is connected to one end of the capacitor 2. A source of the MOSFET 30 is connected to a cathode of the fast recovery diode 4. Turning on and off of the MOSFET 30 is controlled by applying a gate voltage Vgs (gate/source voltage) to a gate of the MOSFET 30.

A connection node of the source of the MOSFET 30 and the cathode of the fast recovery diode 4 is connected to one terminal of the coil 5. The other terminal of the coil 5 is connected to one end of the output capacitor 6. The other end of the output capacitor 6 and an anode of the fast recovery diode 4 are connected to an application end of the ground potential. One end portion of the resistor 7 for discharging of the output capacitor 6 is connected to one end of the output capacitor 6. The other end portion of the resistor 7 is connected to the application end of the ground potential.

The diode 8 and the capacitor 9 are elements for simulating a feedback of the output voltage Vout generated at one end of the output capacitor 6. Specifically, an anode of the diode 8 is connected to the other terminal of the coil 5. A cathode of the diode 8 is connected to one end of the capacitor 9. The other end of the capacitor 9 is connected to one terminal of the coil 5. A voltage generated at a connection node of the cathode of the diode 8 and one end of the capacitor 9 is used as a feedback voltage to be applied to the control IC 3. The control IC 3 controls the MOSFET 30 according to the feedback voltage, accordingly controlling the output voltage Vout to be fixed. A load that is not shown in the drawing is connected between an application end of the output voltage Vout and the application end of the ground potential.

When the MOSFET 30 is turned on, a current flow from the application end of the input voltage Vin through the MOSFET 30 and the coil 5 to a load side, and a drain current (drain/source current) Ids flowing through the MOSFET 30 and a coil current IL flowing through the coil 5 increase. Accordingly, excitation energy is accumulated at the coil 5. Moreover, the solid arrow in FIG. 3 indicates a current path when the MOSFET 30 is turned on.

When the MOSFET 30 is turned off, the drain current Ids does not flow, and the current flows through the fast recovery diode 4 and the coil 5. The coil current IL decreases and excitation energy is released. Moreover, the dotted arrow in FIG. 1 indicates a current path when the MOSFET 30 is turned off.

Figure 2:
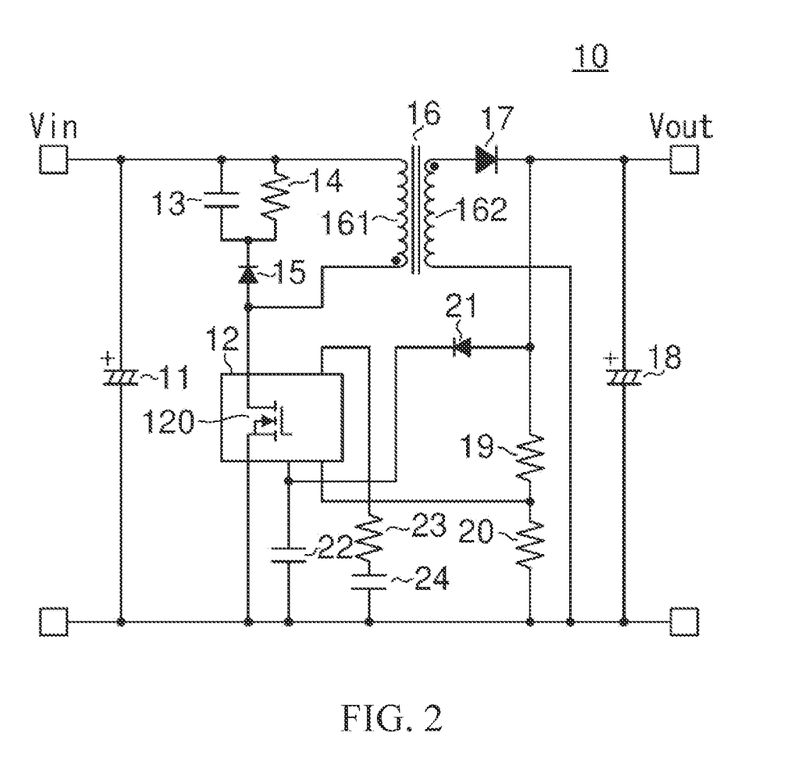
FIG. 2 is a circuit diagram of a configuration of a flyback converter serving as a comparison example.

On the other hand, FIG. 2 shows a configuration example of a flyback converter. A flyback converter 10 shown in FIG. 2 is an isolated converter that converts an input voltage Vin into an output voltage Vout by DC/DC conversion.

The flyback converter 10 includes an input capacitor 11, a control IC 12, a capacitor 13, a resistor 14, a diode 15, a transformer 16, a diode 17, an output capacitor 18, a resistor 19, a resistor 20, a diode 21, a capacitor 22, a resistor 23 and a capacitor 24.

One end of the input capacitor 11 is connected to an application end of the input voltage Vin. The other end of the input capacitor 11 is connected to an application end of a ground potential.

The control IC 12 includes a MOSFET 120 as a switching element. The MOSFET 120 is an N-channel MOSFET. The transformer 16 has a primary winding 161 and a secondary winding 162. The application end of the input voltage Vin is connected to one terminal of the primary winding 161. The other terminal of the primary winding 161 is connected to a drain of the MOSFET 120. A source of the MOSFET 120 is connected to the application end of the ground potential.

The capacitor 13, the resistor 14 and the diode 15 are elements forming a buffer circuit. Specifically, one end of the capacitor 13 and one end portion of the resistor 14 are connected to the application end of the input voltage Vin. The other end of the capacitor 13 and the other end portion of the resistor 14 are connected to a cathode of the diode 15. An anode of the diode 15 is connected to the drain of the MOSFET 120.

One terminal of the secondary winding 162 is connected to an anode of the diode 17. A cathode of the diode 17 is connected to one end of the capacitor 18. The other end of the capacitor 18 and the other terminal of the secondary winding 162 are connected to the application end of the ground potential. The output voltage Vout is generated at one end of the output capacitor 18.

The resistors 19 and 20 are voltage dividing resistors for feeding back the output voltage Vout. The diode 21 and the capacitor 22 are elements that generate a power supply voltage of the control IC 12 based on the output voltage Vout. A configuration of connecting the resistor 23 and the capacitor 24 in series is used as a filter for stabilizing the feedback of the output voltage Vout.

As shown in FIG. 1 and FIG. 2, the buck converter 1 uses a cheap coil 5, and in contrast, the flyback converter 10 requires a costly transformer 16. Moreover, the number of parts of the buck converter 1 is 8, and in contrast, the number of parts of the flyback converter 10 is 14, meaning that the buck converter 1 involves a smaller number of parts. As such, the buck converter 1 is more advantageous than the flyback converter 10 in terms of cost.

Moreover, an installation area of the buck converter 1 relative to a substrate is smaller than that of the flyback converter 10.

Figure 3:
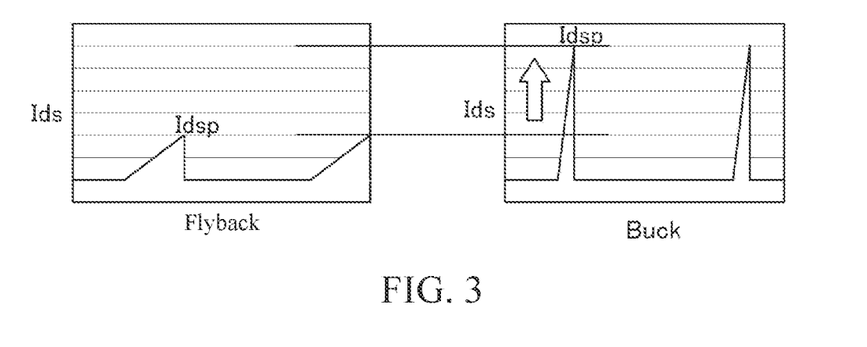
FIG. 3 is a diagram of exemplary waveforms of a drain current flowing through a MOSFET in each of a flyback converter and a buck converter.

Thus, the buck converter 1 is more advantageous compared to the flyback converter 10. However, as described below, the buck converter 1 contains a main factor that inhibits a high output. FIG. 3 shows exemplary waveforms of the respective drain currents Ids of the MOSFETs 120 and 30 flowing through the flyback converter 10 and the buck converter 1. As shown in FIG. 3, a peak value of the drain current Ids of the buck converter 1, that is, a peak current Idsp, is greater than that of the flyback converter 10. Hence, if it is attempted to achieve a high output (for example, 20 W) equal to that of the flyback converter 10 by using the buck converter 1, the peak current Idsp of the drain current Ids flowing through the MOSFET 30 then increases, and the power loss of the MOSFET 30 becomes large.

Figure 4:
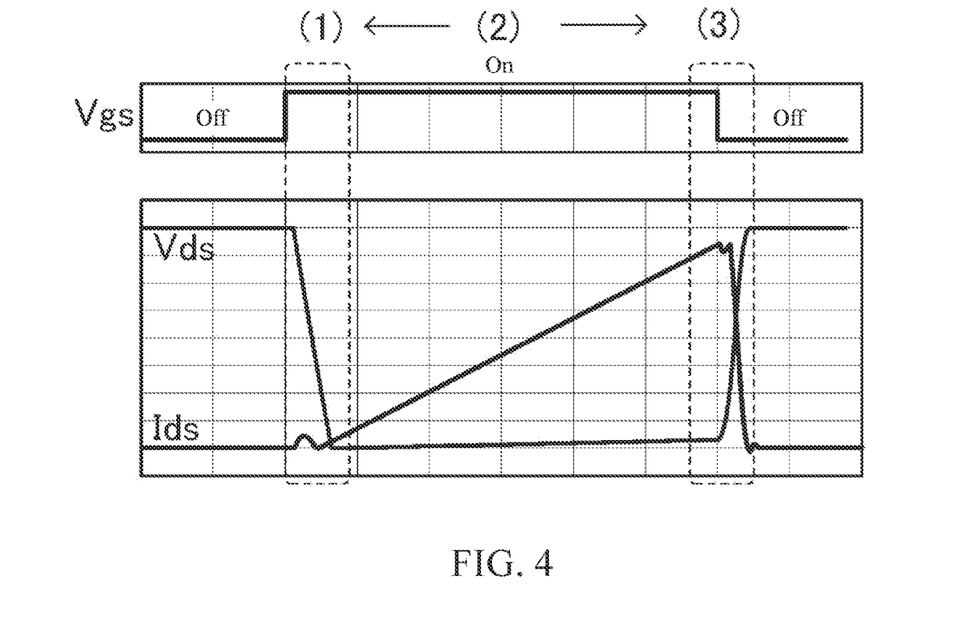
FIG. 4 is a diagram of exemplary waveforms of a gate voltage of a MOSFET, and a drain voltage and a drain current of a MOSFET.

Herein, the power loss of the MOSFET includes (1) switching loss at turn-on, (2) conduction loss, and (3) switching loss at turn-off. FIG. 4 shows exemplary waveforms of the gate voltage Vgs of the MOSFET 30, and the drain voltage Vds and the drain current Ids of the MOSFET 30. (1), (2) and (3) shown in FIG. 4 are periods in which the losses occur.

(1) Switching Loss at Turn-On

The drain current Ids at turn-on can be set to 0 by adjusting the inductance of the coil 5, and so the switching loss can be set to almost zero at turn-on.

Figure 5:
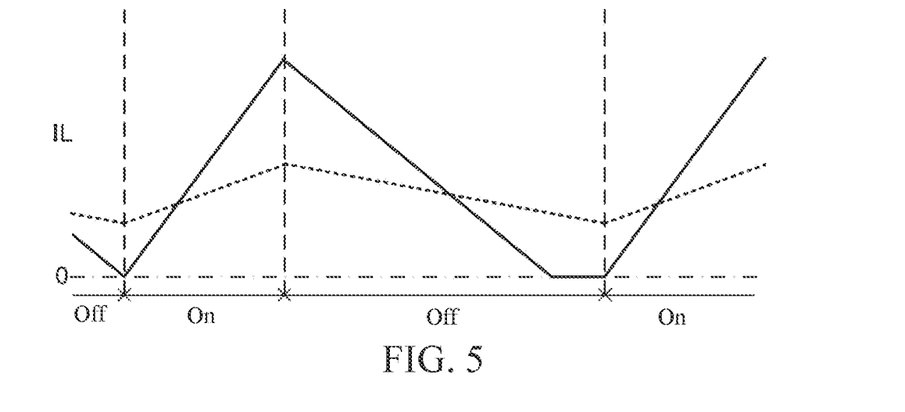
FIG. 5 is a diagram of an exemplary waveform of a coil current.

FIG. 5 shows an exemplary waveform of the coil current flowing through the coil 5. The dotted line in FIG. 5 indicates a situation where the inductance of the coil 5 is relatively great. In this case, a slope of the coil current IL becomes moderate, and the coil current IL (that is, the drain current Ids) at turn-on is higher than zero. The solid line in FIG. 5 indicates a situation where the inductance of the coil 5 is smaller. In this case, because the slope of the coil current IL is steeper and an area between the solid line and 0 is equal to an area between the dotted line and 0 in one switching cycle, the coil current IL of the MOSFET 30 in a turned off state is 0 (a non-continuous mode), and the coil current IL (that is, the drain current Ids) at turn-on can be set to 0.

Figure 6:
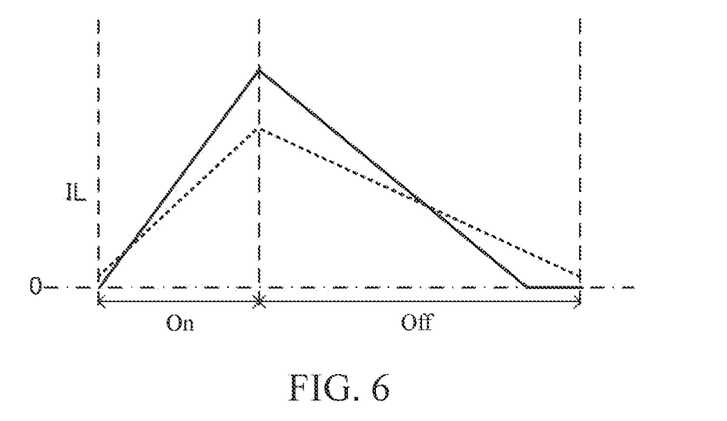
FIG. 6 is a diagram of an exemplary waveform of a coil current.

Moreover, as indicated by the dotted line in FIG. 6, the inductance may also be adjusted by way of also slightly increasing the coil current IL (that is, the drain current Ids) at turn-on. Accordingly, as indicated by the solid line (the same as the solid line in FIG. 5) in FIG. 6, compared to when the drain current Ids is set to 0 at turn-on, the peak value of the drain current Ids (the coil current IL) can be reduced.

(2) Conduction Loss

The conduction loss is loss generated when the MOSFET 30 is turned on, and is expressed by the equation below:

$$Pc = Ids^2 \times Ron \times Ton/T \quad (1)$$

In the equation above, Pc represents the conduction loss, Ron represents an on resistance of the MOSFET 30, Ton represents an on time, and T represents a switching cycle.

If a high output of the buck converter 1 is to be achieved, the conduction loss increases because the peak current Idsp of the drain current Ids becomes higher.

(3) Switching Loss at Turn-Off

Figure 7:
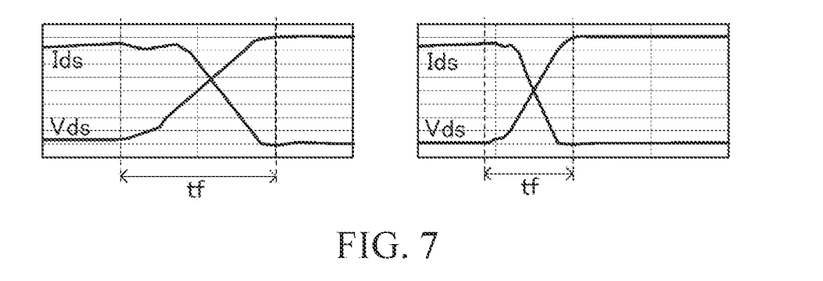
FIG. 7 is a diagram of exemplary waveforms of a drain current and a drain voltage in an off state.

FIG. 7 shows exemplary waveforms of the drain current Ids and the drain voltage Vds at turn-off. The left of FIG. 7 shows a situation where a descending period of the drain current Ids, that is, a descending period tf, is longer, and the right shows a situation where the descending period tf is shorter. The switching speed for turning off becomes faster as the descending period becomes shorter.

$$Poff = (1/6) \times Vin \times Idsp \times tf \times fsw \quad (2)$$

In the equation above, Poff represents the switching loss at turn-off, and fsw represents a switching frequency.

If a high output of the buck converter 1 is to be achieved, the switching loss at turn-off increases because the peak current Idsp of the drain current Ids becomes higher.

<2. Introduction of a Super-Junction MOSFET>

As described above, if a high output in the buck converter 1 is to be achieved, power loss of the MOSFET 30 increases and heat generation becomes an issue. Herein, from the perspective of equation (1), conduction loss can be inhibited if the on resistance Ro can be reduced. Moreover, from the perspective of equation (2), the switching loss at turn-off can be inhibited if the descending period tf can be shortened, that is, if the switching speed at turn-off can be increased.

Therefore, in the disclosure, a super-junction (SJ) MOSFET is to be used to replace a conventionally used plane MOSFET, as the MOSFET 30 in the buck converter 1. The SJ MOSFET is capable of reducing the on resistance Ron and increasing the switching speed.

Figure 8:
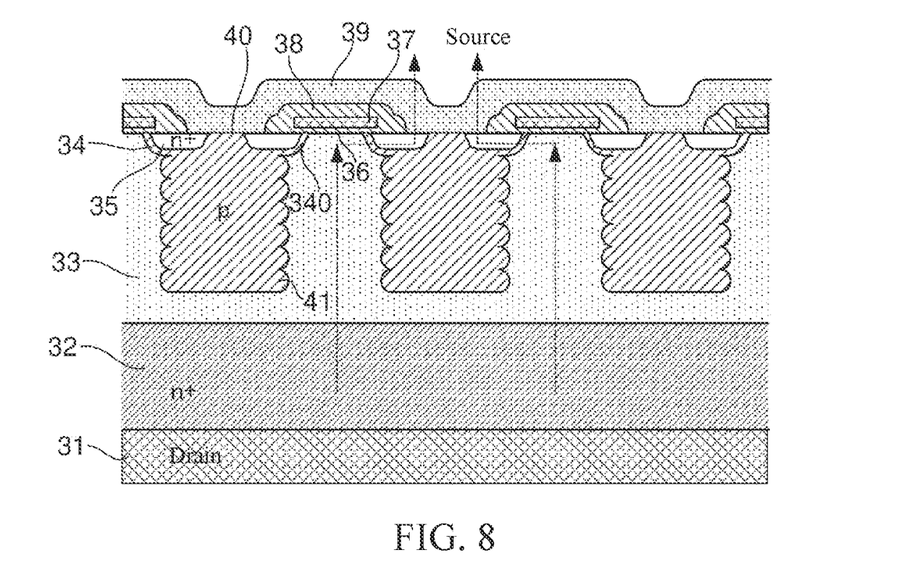
FIG. 8 is a diagram of a longitudinal structure of a part of a MOSFET according to an exemplary embodiment of the disclosure.

FIG. 8 shows a diagram of a longitudinal structure of a part of the MOSFET 30 according to an exemplary embodiment of the disclosure. The MOSFET 30 shown in FIG. 8 is an N-channel MOSFET having a super junction (SJ MOSFET). Moreover, the dotted arrow in FIG. 8 indicates a current path.

The MOSFET 30 includes an $n^+$-type drain layer 32, an $n^-$-type drift layer 33 over the $n^+$-type drain layer 32, a plurality of p-type substrate regions 34 located on an upper surface of the $n^-$-type drift layer 33, and a plurality of $n^+$-type source regions 35 arranged at intervals in an internal side of each of the plurality of p-type substrate regions 34 and on edges of the p-type substrate regions 34. In the example shown in FIG. 8, the p-type substrate regions 34 and the $n^+$-type source regions 35 extend in stripes in a direction perpendicular to the surface of the paper. Channel regions 340 are formed between the edges of the p-type substrate regions 34 and the $n^+$-type source regions 35.

In addition to the configuration above, the MOSFET 30 further includes a gate insulating layer 36 extended in a manner of covering the entire upper surface of the $n^-$-type drift layer 33 (surfaces of the n-type regions), the channel regions 340 and part of the $n^+$-type source regions 35, and a gate electrode 37 located over the gate insulating layer 36. The gate electrode 37 has a planar structure and fully covers the channel regions 340. Upper and side surfaces of the electrode 37 are covered by an interlayer insulating film 38.

The MOSFET 30 further includes a drain electrode 31 electrically connected to the $n^+$-type drain layer 32, and a source electrode 39 electrically connected to the $n^+$-type source regions 35. The source electrode 39 and the gate electrode 37 are insulated by the interlayer insulating film 38. Contact vias 40 are defined at the interlayer insulating film 38, and the source electrode 39 is in contact with the p-type substrate regions 34 and the n⁺-type source regions 35 through the contact vias 40.

Moreover, the MOSFET 30 includes a plurality of p-type row regions 41, which extend from the plurality of p-type substrate regions 34 in the n⁻-type drift layer 33 in a longitudinal direction in the drawing toward the drain layer 32. The p-type regions 41 are constituent elements forming a super-junction structure, and are sometimes referred to as guide posts.

In a conventional plane MOSFET, if a withstand voltage is to be increased, the on resistance increases due to an increased thickness of the drift layer. In the MOSFET 30 having a super-junction structure, with a PN junction of the plurality of p-type row regions 41 horizontally arranged and the n⁻-type drift layer 33 extending longitudinally, the thickness of the drift layer can be decreased even if the withstand voltage is increased, and so a reduced on resistance and a reduced amount of charge at the gate can still be achieved.

Figure 9:
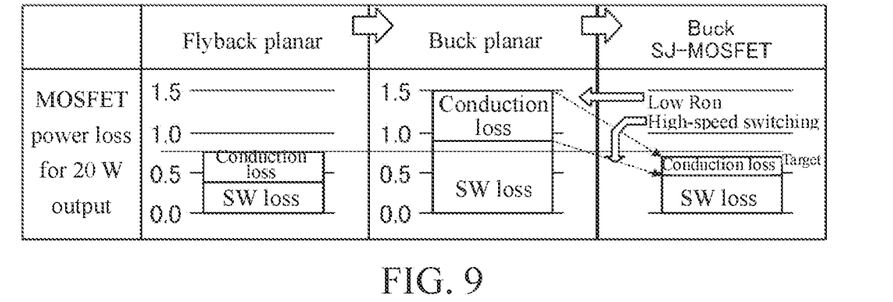
FIG. 9 is a diagram for illustrating an inhibition effect on power loss of a MOSFET.

FIG. 9 shows an example of power loss (=conduction loss+switching loss) of MOSFETs with respect to a flyback converter, a buck converter using a planar MOSFET as a MOSFET and a buck converter using an SJ MOSFET as a MOSFET.

As shown in FIG. 9, if a buck converter with a planar MOSFET is used to achieve a high output equal to that of a flyback converter, the conduction loss and switching loss are both larger than those of the flyback converter. However, if a buck converter having an SJ MOSFET as in the disclosure is used, the conduction loss is reduced by lowering the on resistance, while the switching loss is also reduced by high-speed switching. Accordingly, as shown in FIG. 9, the power loss of a MOSFET lower than a target value is achieved by the disclosure. Therefore, the disclosure achieves a high output in a buck converter that is more advantageous in terms of cost.

<Noise Considerations>

Figure 10:
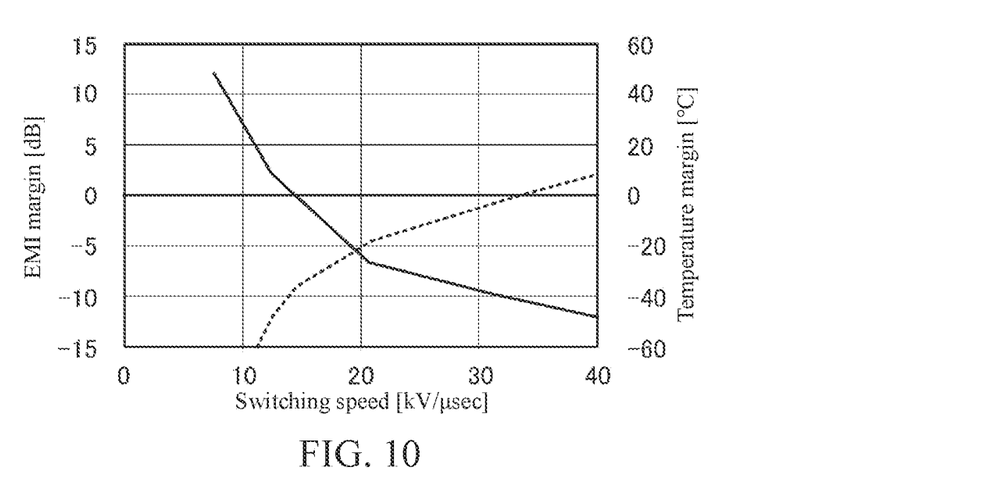
FIG. 10 is a diagram illustrating a relation between a switching speed and an electromagnetic interference (EMI) compatibility margin (the solid line) and a temperature margin (the dotted line).

As described above, although the switching loss can be reduced by increasing the switching speed, there is a possibility of increased noise. FIG. 10 shows an example of a relation between the switching speed and an electromagnetic interference (EMI) margin (the solid line) and a temperature margin (the dotted line). The EMI margin represents a margin relative to a rated noise value, and a temperature margin represents a margin relative to a related junction temperature. If the margin is greater than zero, the condition is cleared.

If the switching speed is increased, the power loss is inhibited, and so the temperature condition is cleared, with however the noise condition remaining. On the other hand, if the switching speed is reduced, the noise condition is cleared, with however the temperature condition remaining because of the increased power loss.

Hence, it is considered that the temperature condition be cleared by increasing the switching speed, and that the noise generated can be handled by a noise countermeasure part. However, this countermeasure faces an issue of increase cost.

Therefore, a countermeasure that prioritizes clearing of the noise condition by reducing the switching speed while reducing the switching loss at turn-on is discussed. Herein, it is known from equation (2) associated with the power loss that, the descending period tf becomes longer by reducing the switching speed; however, if a switching frequency fsw is reduced, the switching loss can be inhibited.

Figure 11:
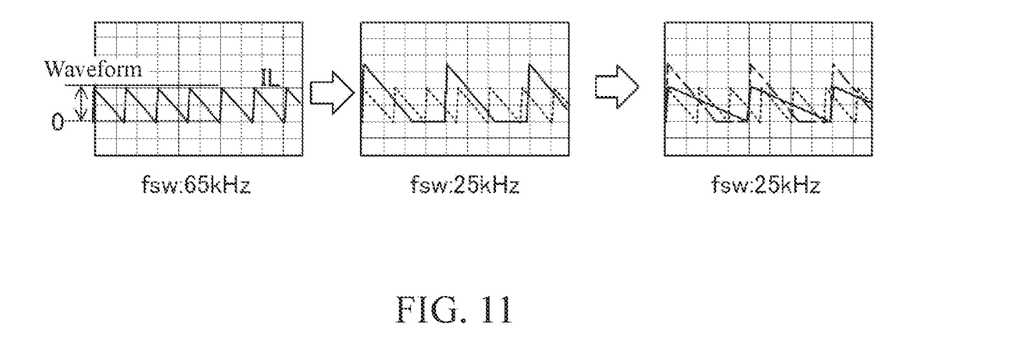
FIG. 11 is a diagram of exemplary waveforms of a coil current when a change occurs in a switching frequency or an inductance of a coil.

Referring to FIG. 11, the left shows an exemplary waveform of the coil current IL when the switching frequency fsw=65 kHz, and the middle shows an exemplary waveform of the coil current IL when the switching frequency fsw=25 kHz. Moreover, in the middle of FIG. 11, the dotted line is the same as the waveform on the left of FIG. 11.

As such, if the switching frequency fsw is reduced, ripples of the coil current IL (that is, the peak value of the drain current Ids) are increased. Thus, if the inductance of the coil is increased, as shown by the solid line on the right of FIG. 11, ripples equal to those of a higher switching frequency (the left of FIG. 11) can be achieved. In the examples in FIG. 11, the inductance L may be increased from 120 μH to more than 300 μH, for example, 330 μH.

An increased inductance could become the main reason of increased cost and an increased installation area. However, compared to the cost and installation area of the transformer included in the flyback converter, the cost and the installation area are nonetheless inhibited.

If the switching frequency is increased, the cost can be reduced by decreasing the inductance and miniaturizing the coil, achieving a tendency of an increased switching frequency. However, as described in the disclosure above, if the tendency is taken in reverse and the switching frequency is reduced, both conditions of noise and power loss can be cleared.

Figure 12:
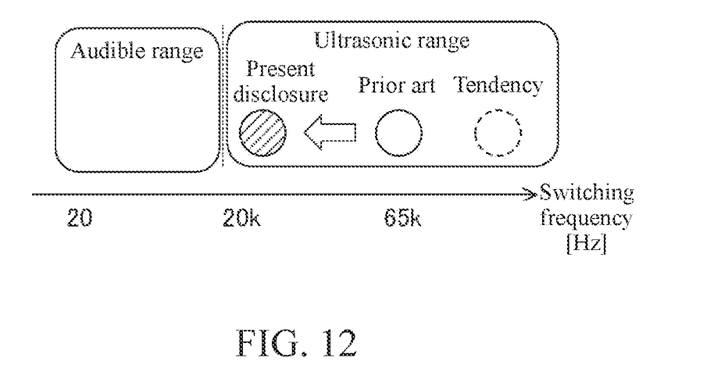
FIG. 12 is a diagram of a preferred setting range of a switching frequency.

Moreover, in the disclosure, as shown in FIG. 12, it is desired that the switching frequency be included above an upper limit (=20 kHz) of an audible range and near the upper limit, that is, in a range of 20 kHz to 30 kHz (fsw=25 kHz in FIG. 11 is included in said range). Accordingly, the switching frequency is reduced as much as possible, while noise audible to the human ear is suppressed.

Figure 13:
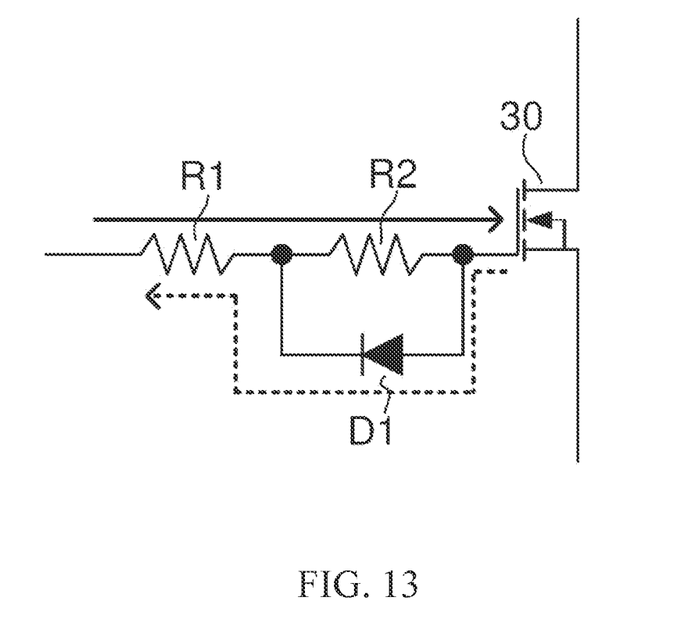
FIG. 13 is a diagram of a configuration example for adjusting a switching speed of a MOSFET.

FIG. 13 shows a configuration example for adjusting the switching frequency of the MOSFET 30. The gate of the MOSFET 30 is connected to one end portion of a resistor R2. The other end portion of the resistor R2 is connected to one end portion of a resistor R1. Moreover, one end portion of the resistor R2 is connected to an anode of a diode D1, and the other end portion of the resistor R2 is connected to a cathode of the diode D1.

When the MOSFET 30 is turned off, as shown by a current path indicated by the solid line in FIG. 13, a current flows through the resistors R1 and R2 and electric charge is supplied to the gate. In addition, when the MOSFET 30 is turned off, as shown by a current path indicated by the dotted line in FIG. 13, a current flows through the diode D1 and the resistor R1 (with the resistor R2 bypassed) and electric charge is drawn from the gate. When turned on, the resistor R2 is dominant relative to the current; when turned off, the resistor R1 is dominant relative to the current. A resistance value of the resistor R1 is adjusted in order to adjust the switching speed when turned off <4. Noise Countermeasure for Layout of the Substrate>

Moreover, in the disclosure, a noise countermeasure for a layout of the substrate is performed when the buck converter 1 is mounted on the substrate as described below.

Figure 14:
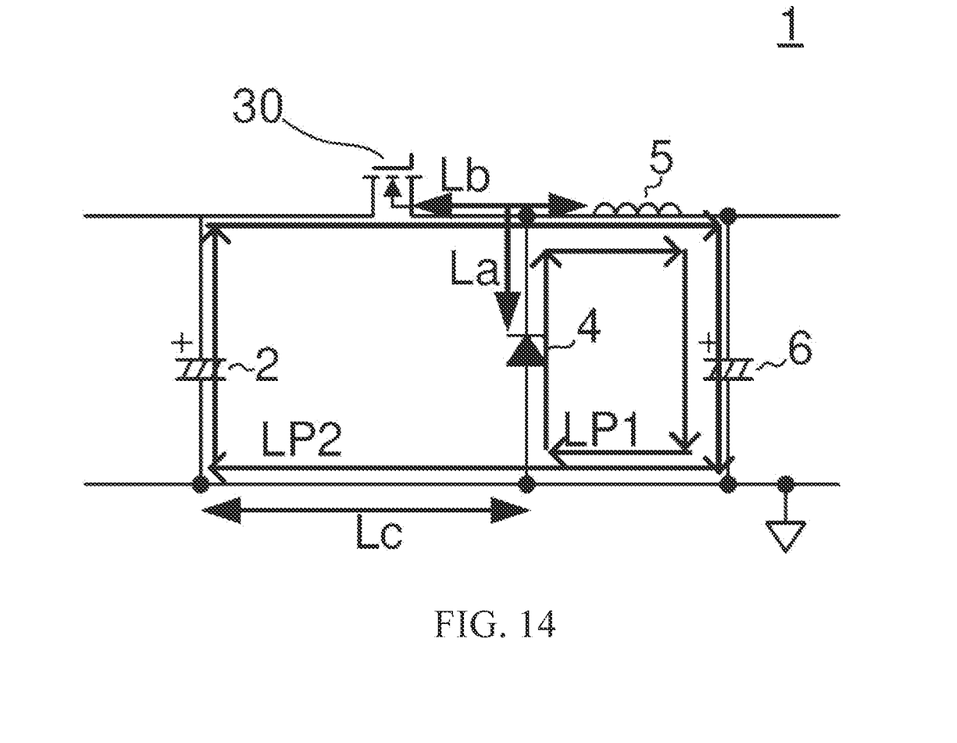
FIG. 14 is a circuit diagram of a layout of a substrate of a buck converter.

As shown in FIG. 14, when the MOSFET 30 is turned off, a length of a loop LP1 along which a generated current flows through the fast recovery diode 4, the coil 5 and the output capacitor 6 is minimized. In particular, a wiring length La between the cathode of the fast recovery diode 4 and one terminal of the coil 5 is shorter than a wiring length Lc between a connection node of the anode of the fast recovery diode 4 and a grounded line and a connection node of the input capacitor 2 and the grounded line.

Moreover, as shown in FIG. 14, when the MOSFET 30 is turned on, a length of a loop L2 along which a generated current flows through the input capacitor 2, the MOSFET 30, the coil 5 and the output capacitor 6 is also minimized. In particular, a wiring length Lb between the source of the MOSFET 30 and one terminal of the coil 5 is shorter than the wiring length Lc.

<5. Other>

Implementation details of the disclosure are as described in the embodiments above. However, various modifications made be made to the embodiments without departing from the scope of the subject of the disclosure.

For example, the disclosure may also be applied to a synchronous rectification buck converter that uses a synchronous rectifier transistor as a rectifying element to replace the fast recovery diode 4.

INDUSTRIAL APPLICABILITY

The disclosure is applicable to a buck converter mounted on, for example, home appliances.

The invention claimed is:

1. A buck converter, comprising:
    a MOSFET, including a first side connected to an application end of an input voltage;
    a rectifying element, connected to a second side of the MOSFET by a first connection node;
    a coil, having a first terminal connected to the first connection node;
    a first capacitor, connected to a second terminal of the coil, wherein the MOSFET is a super-junction MOSFET;
    a first resistor, having a first end portion directly connected to a gate of the MOSFET;
    a second resistor, having a first end portion directly connected to a second end portion of the first resistor;
    a first diode, having:
        an anode, directly connected to the first end portion of the first resistor; and
        a cathode, directly connected to the second end portion of the first resistor,
    a second diode, having:
        an anode, directly connected to the second terminal of the coil; and
        a cathode directly connected to a second end portion of the second resistor; and
    a second capacitor, having a first end directly connected to the cathode of the second diode and a second end directly connected to the first connection node.

2. The buck converter of claim 1, wherein a switching frequency of the MOSFET is in a range of 20 kHz to 30 kHz, and an inductance of the coil is equal to or more than 300 μH (microhenry).

3. The buck converter of claim 1, wherein the rectifying element is a fast recovery diode.

4. The buck converter of claim 2, wherein the rectifying element is a fast recovery diode.

5. The buck converter of claim 3, further comprising an input capacitor, connecting to and between the application end of the input voltage and a grounded line, wherein
    a wiring length between a cathode of the fast recovery diode and the first terminal of the coil is shorter than a wiring length between a second connection node and a third connection node, the second connection node is disposed between an anode of the fast recovery diode and the grounded line, and the third connection node is disposed between the input capacitor and the grounded line.

6. The buck converter of claim 3, further comprising an input capacitor, connecting to and between the application end of the input voltage and a grounded line, wherein
    a wiring length between the second side of the MOSFET and the first terminal of the coil is shorter than a wiring length between a second connection node and a third connection node, the second connection node is disposed between the anode of the fast recovery diode and the grounded line, and the third connection node is disposed between the input capacitor and the grounded line.

7. The buck converter of claim 5, wherein
    a wiring length between the second side of the MOSFET and the first terminal of the coil is shorter than a wiring length between a second connection node and a third connection node, the second connection node is disposed between the anode of the fast recovery diode and the grounded line, and the third connection node is disposed between the input capacitor and the grounded line.

8. The buck converter of claim 1, further comprising a control IC, wherein
    the MOSFET is disposed in the control IC,
    the second end of the second capacitor is connected to the first terminal of the coil, and
    a voltage is generated at a node to which the cathode of the second diode and the first end of the second capacitor are connected as a feedback voltage to be applied to the control IC.

9. The buck converter of claim 2, further comprising a control IC, wherein
    the MOSFET is disposed in the control IC,
    the second end of the second capacitor is connected to the first terminal of the coil, and a voltage is generated at a node to which the cathode of the second diode and the first end of the second capacitor are connected as a feedback voltage to be applied to the control IC.

10. The buck converter of claim 3, further comprising a control IC, wherein
    the MOSFET is disposed in the control IC,
    the second end of the second capacitor is connected to the first terminal of the coil, and
    a voltage is generated at a node to which the cathode of the second diode and the first end of the second capacitor are connected as a feedback voltage to be applied to the control IC.

11. The buck converter of claim 5, further comprising a control IC, wherein
    the MOSFET is disposed in the control IC,
    an anode of the second diode is connected to the second terminal of the coil,
    a cathode of the second diode is connected to a first end of the capacitor,
    the second end of the second capacitor is connected to the first terminal of the coil, and
    a voltage is generated at a node to which the cathode of the second diode and the first end of the second capacitor are connected as a feedback voltage to be applied to the control IC.

12. The buck converter of claim 1, wherein when the MOSFET is in an off state, a coil current flowing through the coil decreases and reaches 0 A (ampere).

13. The buck converter of claim 2, wherein when the MOSFET is in an off state, a coil current flowing through the coil decreases and reaches 0 A.

14. The buck converter of claim 3, wherein when the MOSFET is in an off state, a coil current flowing through the coil decreases and reaches 0 A.

15. The buck converter of claim 5, wherein when the MOSFET is in an off state, a coil current flowing through the coil decreases and reaches 0 A.

16. The buck converter of claim 1, wherein the MOSFET further comprises a second side connected to the first connection node, and the rectifying element is directly connected to the first connection node.

17. The buck converter of claim 1, wherein the super-junction MOSFET comprises:
   a drift layer having a first conductivity type;
   a plurality of substrate regions located on an upper surface of the drift layer and having a second conductivity type; and
   a plurality of row regions extending from the plurality of substrate regions in the drift layer in a longitudinal direction and having the second conductivity type.

* * * * *